United States Patent

[11] 3,560,769

[72] Inventors Tetsuji Shimizu; Susumu Usami, Nagoya, Japan
[21] Appl. No. 725,396
[22] Filed Apr. 30, 1968
[45] Patented Feb. 2, 1971
[73] Assignee Kabushiki Kaisha Tokai Rika Denki Seisakusho, Nishikasugai-gun Aichi-Prefecture, Japan
[32] Priority May 9, 1967
[33] Japan
[31] 42/39022

[54] SEQUENTIAL FLASHER
4 Claims, 2 Drawing Figs.

[52] U.S. Cl. .................... 307/293, 307/223, 307/273, 307/288; 328/130; 340/331
[51] Int. Cl. .................... H03k 17/28, H03k 23/08
[50] Field of Search .................... 307/273, 288, 293, 223; 328/130; 340/331

[56] References Cited

UNITED STATES PATENTS

| | | | |
|---|---|---|---|
| 3,244,906 | 4/1966 | Goering | 307/273X |
| 3,244,909 | 4/1966 | Henderson | 307/273X |
| 3,248,558 | 4/1966 | Seif | 307/273X |
| 3,378,693 | 4/1968 | Schmidt | 307/273X |

*Primary Examiner*—John S. Heyman
*Attorney*—McGlew and Toren

ABSTRACT: A sequential flasher includes a plurality of successive stages connected in cascade and each including a PNP transistor, having its emitter connected to the positive terminal of a source of potential, and an NPN transistor. Each stage includes a first loop constituted by the emitter of the PNP transistor, a resistor connecting the base thereof to the collector of the NPN transistor, and a resistor and a condenser connected in series between the base of the NPN transistor and the collector of the PNP transistor. A second loop is constituted by a resistance connecting the emitter of the NPN transistor to the junction of the resistor and the condenser. Each stage has a respective load connected between the collector of its PNP transistor and the negative terminal of the source. The collector of each PNP transistor, except that of the last stage, is connected to the emitter of the NPN transistor of the next succeeding stage, with the collector of the last PNP transistor being connected to the emitter of the NPN transistor. The resistance may be a resistor or may be a diode. A starting condenser is connected in at least the first stage.

INVENTOR.
TETSUJI SHIMIZU
SUSUMU USAMI
BY
Mawgler and Tower
Attorneys

SEQUENTIAL FLASHER

The present invention relates to a sequential flasher energizing and deenergizing successively and automatically electric bulbs, lamps, or relays, serving as loads provided in a plurality of stages or circuits, and effecting cyclically and repetitively this operation.

Most conventional sequential flasher flashers of this type have incorporated mechanical means, such as snap action switches operated in succession by means of cams of different configurations provided on the reduced speed output shaft of DC permanent magnetic field-type motor. The sequential flasher of the present invention has basically a different system from the conventional flasher and employs no mechanical switch means.

BRIEF DESCRIPTION OF THE DRAWINGS

The accompanying drawings show a preferred embodiment of sequential flasher of the present invention, wherein.

In the preferred embodiment of sequential flasher of the present invention, the sequential flasher is constituted by a plurality of stages or circuits W1, W2, W3, . . . Wn arranged in cascade connection and each including a feedback loop or feedback circuit incorporating a PNP-type transistor Tra, whose base is connected to a collector of an NPN-type transistor Trb through a resistor Rb and whose collector is connected to the base of the NPN transistor through a condenser C, and resistor Rc. The emitter of each NPN transistor is connected to the junction between the associated condenser C and the associated resistor Rc, through a diode D. The several stages have respective load L1, L2, L3, . . . Ln, such as electric bulbs, lamps, or relays, interconnected between collectors of the respective PNP transistors and the negative terminal of the potential source. In addition, the several stages are interconnected through lines 11, 12, 13, . . ., which connect the collectors of each PNP transistor to the emitter of the PNP transistor of the next succeeding stage, except for the last stage. In the last stage Wn, the collector of the PNP transistor is connected to the emitter of the PNP transistor of the first stage through line 1n. A starting condenser C2 is connected in parallel with the collector-emitter circuit of the PNP transistor of the first stage. A control switch S is provided to connect the flasher to the source of potential. Also, each stage has a respective resistor Ra for protecting the transistors thereof with respect to temperature and voltage.

Figure 1:
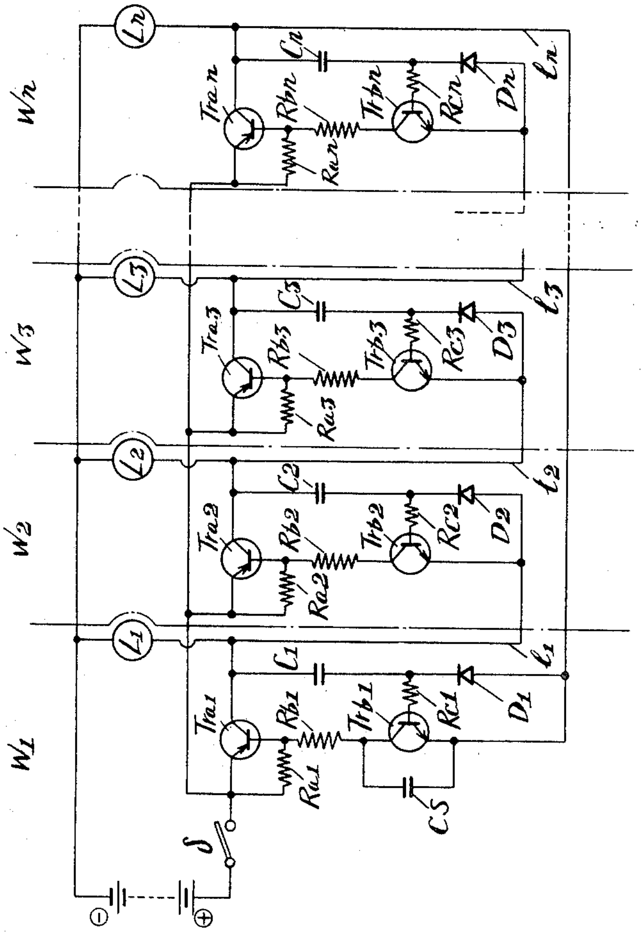
FIG. 1 is a circuit diagram of a sequential flasher of the present invention.
Figure 2:
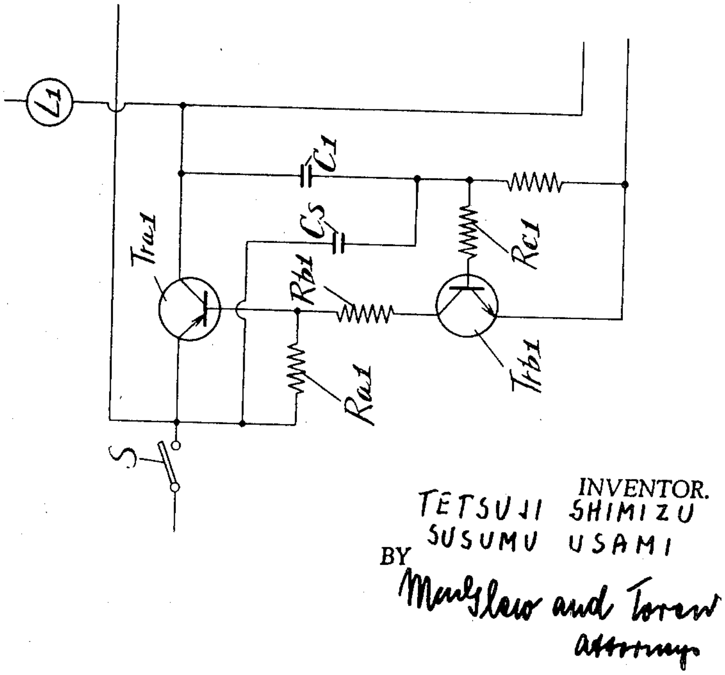
FIG. 2 is a partial circuit diagram illustrating a modification of the flasher shown in FIG. 1.

A diode D, in the present invention, may be substituted by a resistor. The starting condenser Cs may be connected in a manner as shown in FIG. 2.

The sequential flasher of the present invention operates as follows. When starting switch S is closed the base current of the transistor tral flows through the resistor Rb1 of the first stage W1, the starting condenser Cs and the load Ln of the terminal stage to raise the collector potential of transistor Tra1. Consequently, the base current for the transistor Trb1 flows through the condenser C1, resistor Rc1 and the load Ln of the terminal stage Wn to increase the collector current of transistor Trb1. By this, the collector potential of the transistor Tra1 rises still more. With such continuous and repetitive current flow, the transistor Tra1 is rapidly brought into full conduction to energize the load L1. Then, the condenser C1 becomes fully charged, and its charging current is reduced. The charging of condenser C1, at this time, is effected by the voltage of potential source. On the other hand, immediately the transistor Tra1 comes into conduction, the transistor Trb1 is reversely biased to be rapidly turned into the nonconductive or blocking state to deenergize the load L1. With the first stage W1 being kept in operation, the collector potential of the transistor Tra1 increases to a value substantially equal to the voltage of the potential source. Then, charging a condenser C2 of the second stage W2 is effected at its terminal connected to the diode D2, through a loop including transistor Tral, diode D2, condenser C2, load L2 and the negative terminal of the potential source. During charging of the condenser, transistors Tra2 and Trb2 remain nonconductive, since the emitter of transistor Trb2 is connected to the collector of transistor Tral of the preceeding stage. Thus, no current flows between transistors Tral and Tra2.

However, immediately as the first stage W1 becomes inoperative, as described, the charge stored in the condenser C2 flows into the base of the transistor Trb2 through the resistor Rc2, thereby putting transistor Trb2 into the conductive state. Thus, the transistor Tra2 is brought into conduction to energize the load L2. After a certain time interval, the second stage becomes nonconductive to deenergize the load L2, in a manner similar to the first stage W1. In synchronism with deenergization of the L2, the h third stage W3 becomes to operation to energize the load L3, in the same way as described for the second stage W2. In the manner as described, the loads L1, L2, L3, . . . Ln are energized and deenergized successively and cyclically, with respective stages W1, W2, W3, . . . Wn being sequentially put into operative or nonoperative states.

Immediately when a stage becomes nonconductive, the condenser C of the corresponding stage discharges through a discharge loop formed by a diode D, a load L of the respective stage and a load of the preceding stage. Thus, when the terminal stage Wn is brought into operation, the condenser C1 of the first stage W1 is charged on the side near to the diode D1. As soon as terminal stage Wn becomes nonconductive, the first stage W1 automatically comes into operation. In this manner, sequential energization and deenergization of loads are effected cyclically.

Since the operating time of respective stages depends upon the product of the values of a condenser C and a resistor R, the time interval between energization or deenergization of any particular load may be determined by using condensers and resistors of particular values.

If a starting condenser Cs is in every two or more stages, sequential and cyclical flash operations are effected in multiple ways.

In FIG. 2, a diode is substituted by a resistor, but operation is the same as described hereinabove. In case the starting condenser Cs is connected as shown in FIG. 2, the base current of the transistor Trb1 flows through a loop constituted by the condenser Cs, the resistor Rc1, the transistor Trb1, the line 1n and the load Ln of the terminal stage Wn. Consequently, the collector current of transistor Trb1 flows. In other words, the base current of the transistor Tra1 flows to raise the collector potential of transistor Tra1. Thus, positive feedback takes place through a loop comprising the condenser C1 and the resistor Rc1 to put the transistors Trb1 and Tra1 into operation.

The sequential flasher of the present invention may be basically constituted by monostable multivibrator circuits arrange arranged in cascade connection.

In a general monostable multivibrator circuit which either necessitates two sources of electric potential or employs one potential source, there is a resistor common to an emitter. This disadvantageously causes a larger drop in voltage, or overheating in a transistor, and fails in producing sufficient output.

The sequential flasher of the present invention represents a substantial improvement, overcoming the foregoing disadvantages. In addition, the sequential flasher has an advantageous construction and operation, in that starting in the respective stages is very smooth, a transistor of a succeeding stage is not brought into conduction unless the preceding stage has become nonconductive, while the stage is in a nonconductive state, both of its transistors remain nonconductive. This minimizes power loss in the respective stages, and such power loss has been substantial in the conventional monostable multivibrator circuit having a transistor which is usually maintained conductive.

We claim:

1. A sequential flasher comprising, in combination, a source of electric potential; a plurality of successive stages arranged in cascade connection and each including a PNP transistor, having its emitter connected to the positive terminal of said source, and an NPN transistor; each stage including a first loop constituted by the emitter of the respective PNP transistor, a resistor connecting the base thereof to the collector of the associated NPN transistor, and a resistor and condenser connected in series between the base of said associated NPN transistor and the collector of said respective PNP transistor; each stage further including a second loop constituted by a resistance connecting the emitter of said associated NPN transistor to the junction of said resistor and said condenser; a respective load connected between the collector of each PNP transistor and the negative terminal of said source; circuit means connecting the collector of the PNP transistor of each stage, except the last stage, to the emitter of the NPN transistor of the next succeeding stage; and circuit means connecting the collector of the PNP transistor of the last stage to the emitter of the NPN transistor of the first stage.

2. A sequential flasher, as claimed in claim 1, wherein said resistance in said second loop is a resistor.

3. A sequential flasher, as claimed in claim 1 wherein said resistance in said second loop is a diode.

4. A sequential flasher, as claimed in claim 1, including a starting condenser connected in parallel with the collector-emitter circuit of the NPN transistor of the first stage.